United States Patent
Wheat et al.

(10) Patent No.: US 7,354,463 B2
(45) Date of Patent: *Apr. 8, 2008

(54) APPARATUS AND METHODS FOR PRODUCING HYDROGEN

(75) Inventors: W. Spencer Wheat, Missouri City, TX (US); Hongqiao Sun, Sugar Land, TX (US); Bhaskar Balasubramanian, Houston, TX (US); Vesna R. Mirkovic, Pearland, TX (US)

(73) Assignee: Texaco Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/015,711

(22) Filed: Dec. 17, 2004

(65) Prior Publication Data

US 2006/0130402 A1    Jun. 22, 2006

(51) Int. Cl.
*C01B 3/32* (2006.01)
*C10J 3/54* (2006.01)
*B32B 5/02* (2006.01)

(52) U.S. Cl. ............... 48/127.3; 48/127.7; 48/197 R; 48/61; 422/105; 422/107; 422/111; 422/112; 422/114

(58) Field of Classification Search .............. 95/1, 95/16, 15, 19, 90, 96; 48/61, 127.3, 127.7, 48/197 R; 422/105, 107, 111, 112, 114
See application file for complete search history.

(56) References Cited

U.S. PATENT DOCUMENTS

| | | | |
|---|---|---|---|
| 4,047,904 A | 9/1977 | Worrall | |
| 4,140,495 A | 2/1979 | Pietruszewski | |
| 4,238,204 A | 12/1980 | Perry | |
| 4,323,370 A | 4/1982 | Leitgeb | |
| 4,598,836 A | 7/1986 | Wessel | |
| 4,690,695 A | 9/1987 | Doshi | |
| 4,693,730 A | 9/1987 | Miller et al. | |
| 4,725,293 A | 2/1988 | Gunderson | |
| 4,857,086 A | 8/1989 | Kawai | |
| 4,925,464 A | 5/1990 | Rabenau et al. | |
| 4,927,434 A | 5/1990 | Cordes et al. | |

(Continued)

FOREIGN PATENT DOCUMENTS

WO    WO 2004/054013 A2    6/2004

*Primary Examiner*—N. Bhat
(74) *Attorney, Agent, or Firm*—Frank C. Turner; Melissa Patangia (57) ABSTRACT

An apparatus and method for producing a hydrogen-enriched reformate. The apparatus includes a fuel processor for producing a reformate having fluctuations in a pressure and/or flow rate and means for reducing the fluctuations. The reformate comprises impurities that are removed by a purification unit having a plurality of adsorbent beds. A valve assembly controls the flow of reformate to the adsorbent beds based upon sensed product data generated by a product sensor. A compression unit optionally compresses the reformate prior to entering the purification unit. Means for reducing fluctuations in the pressure and/or flow rate include a buffer and/or a conduit for providing a controlled flow of a supplemental fluid to an inlet of the compression unit. A product valve can control the flow of hydrogen-enriched reformate out of the purification unit. A controller can control the valve assembly, the flow of supplemental fluid and the product valve among other apparatus components to maintain a stable pressure within the purification unit and to produce a desired hydrogen-enriched reformate.

28 Claims, 3 Drawing Sheets

U.S. PATENT DOCUMENTS

| | | |
|---|---|---|
| 4,995,889 A | 2/1991 | Abel et al. |
| 5,042,994 A | 8/1991 | Smolarek |
| 5,082,473 A | 1/1992 | Keefer |
| 5,112,367 A | 5/1992 | Hill |
| 5,256,174 A | 10/1993 | Kai et al. |
| 5,258,056 A | 11/1993 | Shirley et al. |
| 5,435,836 A | 7/1995 | Anand et al. |
| 5,593,478 A | 1/1997 | Hill et al. |
| 5,632,804 A | 5/1997 | Schartz |
| 5,669,960 A | 9/1997 | Couche |
| 5,753,010 A | 5/1998 | Sircar et al. |
| 5,807,423 A | 9/1998 | Lemcoff et al. |
| 5,827,358 A | 10/1998 | Kulish et al. |
| 5,876,485 A | 3/1999 | Andreani |
| 5,917,135 A | 6/1999 | Michaels et al. |
| 6,056,804 A | 5/2000 | Keefer et al. |
| 6,063,161 A | 5/2000 | Keefer et al. |
| 6,270,556 B1 | 8/2001 | Rouge et al. |
| 6,273,936 B1 | 8/2001 | Barry et al. |
| 6,277,174 B1 | 8/2001 | Neu et al. |
| 6,372,026 B1 | 4/2002 | Takemasa et al. |
| 6,406,523 B1 | 6/2002 | Connor et al. |
| 6,432,176 B1 | 8/2002 | Klos et al. |
| 6,451,095 B1 | 9/2002 | Keefer et al. |
| 6,471,744 B1 | 10/2002 | Hill |
| 6,488,747 B1 | 12/2002 | Keefer et al. |
| 6,497,755 B2 | 12/2002 | Murdoch et al. |
| 6,533,846 B1 | 3/2003 | Keefer et al. |
| 6,544,316 B2 | 4/2003 | Baker et al. |
| 6,619,336 B2 | 9/2003 | Cohen et al. |
| 6,712,087 B2 | 3/2004 | Hill et al. |
| RE38,493 E | 4/2004 | Keefer et al. |
| 6,723,156 B2 | 4/2004 | Edlund et al. |
| 6,767,389 B2 | 7/2004 | Edlund et al. |
| 6,770,391 B2 | 8/2004 | Nelson et al. |
| 2002/0094310 A1 | 7/2002 | Krause et al. |
| 2003/0175564 A1 | 9/2003 | Mitiitsky et al. |
| 2004/0107831 A1 | 6/2004 | Graham et al. |
| 2004/0115504 A1 | 6/2004 | Moeller et al. |

```
┌─────────────────────────────────────────────────────────────────┐
│ PRODUCING A REFORMATE COMPRISING HYDROGEN AND AN IMPURITY IN    │
│ A FUEL PROCESSOR, THE REFORMATE HAVING FLUCTUATIONS IN PRESSURE │
│                    AND/OR FLOW RATE                             │
└─────────────────────────────────────────────────────────────────┘
                                 │
                                 ▼
┌─────────────────────────────────────────────────────────────────┐
│       REDUCING THE FLUCTUATIONS IN PRESSURE AND/OR FLOW RATE    │
└─────────────────────────────────────────────────────────────────┘
                                 │
                                 ▼
┌─────────────────────────────────────────────────────────────────┐
│ DIRECTING A FLOW OF THE REFORMATE THROUGH A VALVE ASSEMBLY TO   │
│ ONE OR MORE OF A PLURALITY OF ADSORBENT BEDS FOR AN ADSORPTION  │
│ PERIOD TO REMOVE IMPURITY FROM THE REFORMATE AND TO PRODUCE A   │
│                    HYDROGEN-ENRICHED REFORMATE                  │
└─────────────────────────────────────────────────────────────────┘
                                 │
                                 ▼
┌─────────────────────────────────────────────────────────────────┐
│  SENSING THE HYDROGEN-ENRICHED REFORMATE OR A HYDROGEN-         │
│  DEPLETED REFORMATE TO GENERATE SENSED PRODUCT DATA             │
└─────────────────────────────────────────────────────────────────┘
                                 │
                                 ▼
┌─────────────────────────────────────────────────────────────────┐
│       ADJUSTING THE ADSORPTION PERIOD IN RESPONSE               │
│                 TO SENSED PRODUCT DATA                          │
└─────────────────────────────────────────────────────────────────┘
```

*FIG. 5*

APPARATUS AND METHODS FOR PRODUCING HYDROGEN

FIELD OF THE INVENTION

The present invention relates generally to the field of hydrogen production. The apparatus and methods of the present invention produce a hydrogen-enriched reformate by removing impurities from a reformate comprising hydrogen and one or more impurities through selective adsorption. The selective adsorption can be carried out in a pressure swing adsorption unit wherein the adsorption period is controlled and adjusted to achieve greater product purity. More specifically, the present invention relates to the integration and operation of a pressure swing adsorbent unit with a fuel processing unit to produce a hydrogen-enriched reformate.

BACKGROUND OF THE INVENTION

Hydrogen is utilized in a wide variety of industries ranging from aerospace to food production to oil and gas production and refining. Hydrogen is used in these industries as a propellant, an atmosphere, a carrier gas, a diluent gas, a fuel component for combustion reactions, a fuel for fuel cells, as well as a reducing agent in numerous chemical reactions and processes. In addition, hydrogen is being considered as an alternative fuel for power generation because it is renewable, abundant, efficient, and unlike other alternatives, produces zero emissions. While there is widespread consumption of hydrogen and great potential for even more, a disadvantage which inhibits further increases in hydrogen consumption is the absence of an infrastructure that can provide generation, storage and widespread distribution of hydrogen.

One way to overcome this difficulty is through distributed generation of hydrogen, such as through the use of fuel processors to convert hydrocarbon-based fuels to hydrogen-rich reformate. Fuel reforming processes, such as steam reforming, partial oxidation, and autothermal reforming, can be used to convert hydrocarbon-based fuels such as natural gas, LPG, gasoline, and diesel, into hydrogen-rich reformate at the site where the hydrogen is needed. However, in addition to the desired hydrogen product, fuel reformers typically produce undesirable impurities that reduce the value of the reformate product. For instance, in a conventional steam reforming process, a hydrocarbon feed, such as methane, natural gas, propane, gasoline, naphtha, or diesel, is vaporized, mixed with steam, and passed over a steam reforming catalyst. The majority of the hydrocarbon feed is converted to a reformate mixture of hydrogen and impurities such as carbon monoxide and carbon dioxide. To reduce the carbon monoxide content, the reformate is typically subjected to a water-gas shift reaction wherein the carbon monoxide is reacted with steam to form carbon dioxide and hydrogen. After the shift reaction(s), additional purification steps may be utilized to bring the hydrogen purity to acceptable levels. These purification steps can include, but are not limited to, methanation, selective oxidation reactions, membrane separation techniques, and selective adsorption such as temperature swing adsorption and/or pressure swing adsorption processes.

Gas separation by pressure swing adsorption (PSA) is achieved by coordinated pressure cycling over an adsorbent bed that preferentially adsorbs a more readily adsorbed component relative to a less readily adsorbed component of the mixture. In a conventional PSA device, two or more adsorbent beds are connected in alternating sequence by directional valving to pressure sources and sinks for establishing the changes of working pressure and flow direction. In another conventional PSA device, flows to and from adsorbent beds are controlled by a rotary distribution valve that is rotated to cycle the adsorbent beds through adsorption and regeneration phases. For instance, the separation of oxygen from air is a known application of such conventional PSA devices. However, in such applications the composition of the gas mixture, its pressure and/or flow rate are typically fixed and known. In contrast, the integration of a PSA device to a fuel processor that produces a reformate of varying composition, pressure and/or flow rate imposes challenges to the efficient operation of such an integrated system.

SUMMARY OF THE INVENTION

In an aspect of the present invention an apparatus for producing hydrogen-enriched reformate is provided. The apparatus includes a fuel processor for producing a reformate comprising hydrogen and an impurity, the reformate having fluctuations in pressure and/or flow rate. Means for reducing the fluctuations in pressure and/or flow rate in the reformate are also provided. The apparatus also includes a purification unit capable of removing impurity from the reformate to produce a hydrogen-enriched reformate. The purification unit has a plurality of adsorbent beds and a valve assembly capable of selectively controlling a flow of the reformate to one or more of the plurality of adsorbent beds. The apparatus can optionally include a compression unit for producing a compressed reformate for delivery to the purification unit. The means for reducing fluctuations in the pressure and/or flow rate of the reformate can include one or more of a buffer disposed intermediate the fuel processor and the purification unit and a conduit for providing a controlled flow of a supplemental fluid to an inlet of the compression unit. A product sensor is disposed downstream of the purification unit that is capable of sensing the hydrogen-enriched reformate and/or a hydrogen-depleted reformate to generate sensed product data. The valve assembly controls the flow of reformate in response to the sensed product data.

In a process aspect of the present invention, a method for producing a hydrogen-enriched reformate is provided. The method includes the step of producing a reformate comprising hydrogen and an impurity in a fuel processor. The reformate produced has fluctuations in pressure and/or flow rate, both during transient and steady state operations of the fuel processor. As a result, the method further includes reducing the fluctuations in the pressure and/or flow rate of the reformate. A flow of reformate is directed to one or more of a plurality of adsorbent beds within a purification unit for an adsorption period to remove impurity from the reformate and to produce a hydrogen-enriched reformate. The hydrogen-enriched reformate or a hydrogen-depleted reformate is sensed to produce sensed product data and the adsorption period is adjusted in response to the sensed product data.

BRIEF DESCRIPTION OF THE DRAWINGS

The invention may be understood by reference to the following description taken in conjunction with the accompanying drawings.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

Illustrative embodiments of the invention are described below. In the interest of clarity, not all features of an actual embodiment are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The reformate stream of a fuel processor is typically rich in hydrogen but can contain one or more impurities such as carbon monoxide, carbon dioxide, water, steam, inert components such as nitrogen and argon, various sulfur and nitrogen-containing compounds as well as unreacted hydrocarbons. Such impurities must be removed or reduced to extremely low levels to render the hydrogen reformate safe and reliable. In addition, such reformate streams can have fluctuations in pressure and/or flow rate that can interfere with the purification and clean-up of the reformate. The present invention is directed to an apparatus and method that can reduce or dampen fluctuations in the pressure and/or flow rate of a reformate produced by a fuel processor and adjust the operation of a purification unit so as to compensate for such fluctuations to produce a hydrogen-enriched reformate having a more uniform composition.

An apparatus of the present invention includes a fuel processor capable of producing a reformate comprising hydrogen and an impurity. The reformate can have fluctuations in composition, pressure and/or flow rate and means are provided for reducing the fluctuations. Optionally, a compression unit can be disposed downstream of the fuel processor for receiving the reformate and producing a compressed reformate for delivery to a purification unit. A purification unit is provided downstream of the fuel processor for removing impurity from the flow of reformate and thereby produce a hydrogen-enriched reformate. The purification unit has a plurality of adsorbent beds and a valve assembly for selectively controlling a flow of the reformate to one or more of the plurality of adsorbent beds. A product sensor is disposed downstream of the purification unit for sensing the hydrogen-enriched reformate and generating sensed product data. The valve assembly controls the flow of reformate to the plurality of adsorbent beds in response to the sensed product data generated by the product senor.

A fuel processor suitable for use in an apparatus of the present invention includes a device or apparatus that is capable of producing a reformate comprising hydrogen and one or more impurities. The ultimate objective of an apparatus of the present invention is to produce a substantially pure hydrogen product that can be used safely and reliably in any hydrogen-consuming device or process. As such, an "impurity" in this context includes any material that has the potential to foul, damage or otherwise interfere with the operation of hydrogen-consuming device or process as well as any hydrogen-storage device. Such impurities typically include sulfur-containing compounds, nitrogen-containing compounds, carbon oxides, liquid water, steam, unreacted hydrocarbons, and inert gases. Depending on the type of fuel processor and its operational state, variations or fluctuations in the pressure, flow-rate and/or composition of the reformate can occur.

Figure 4:
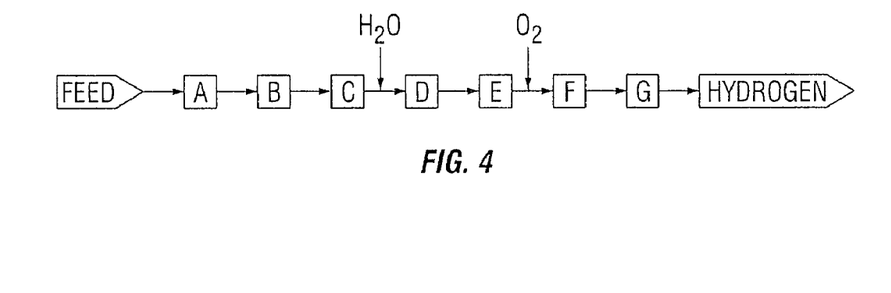
FIG. 4 is a block diagram illustrating a process flow within a fuel processor.

In some embodiments, the fuel processor comprises an oxidizer and reformer for converting a fuel to a reformate that comprises hydrogen and one or more impurities. Reformers are well known in the fuel processing art and can be designed to perform one or more of steam reforming, partial oxidation, and autothermal reforming among others. Although fuel processors suitable for use as the fuel processor can utilize any known reformer, the following description associated with FIG. 4 is adapted from U.S. patent application Ser. No. 10/006,963, entitled "Compact Fuel Processor for Producing a Hydrogen Rich Gas," filed Dec. 5, 2001, in the name of Krause, et al., and published Jul. 18, 2002 (Publication No. US2002/0094310 A1), which describes a fuel processor for performing a combination of steam reforming and autothermal reforming:

As illustrated in FIG. 4, the feed to the fuel processor can include a hydrocarbon-based fuel, oxygen, water, and mixtures of the same. Hydrocarbon-based fuels suitable for use in the processor can include natural gas, LPG, gasoline, diesel, alcohols, and mixtures thereof. Natural gas is a preferred hydrocarbon-based fuel. Oxygen can be in the form of air, oxygen-enriched air, or substantially pure oxygen. Fuel(s) and water can be introduced as liquid and/or vapor. However, depending on the initial phase of the feed materials and the nature of the reforming reaction(s) some degree of feed preparation may be required. For instance, it is preferred that both liquid water and fuel(s) be converted to a gas phase, and further that reactants be pre-heated prior to their introduction into a reaction zone within the reformer.

Block A of FIG. 4 represents a reforming step, in which, in one particular embodiment, two reactions, a partial oxidation (formula I, below) and a steam reforming (formula II, below), are performed to convert the feed into a synthesis gas containing hydrogen and carbon monoxide. Formulas I and II are exemplary reaction formulas wherein methane is considered as the hydrocarbon:

$$CH_4 + \tfrac{1}{2}O_2 \rightarrow 2H_2 + CO \qquad (I)$$

$$CH_4 + H_2O \rightarrow 3H_2 + CO \qquad (II)$$

A higher concentration of oxygen in the feed stream favors the exothermic partial oxidation whereas a higher concentration of water vapor favors the endothermic steam reforming reaction. Therefore, the ratios of oxygen to hydrocarbon and water to hydrocarbon as well as the reaction temperature are characterizing parameters that affect hydrogen yield. The reaction temperature of reforming step A can range from about 550° C. to about 900° C., depending on the feed conditions and the catalyst. Examples of partial oxidation and steam reforming catalysts are well known in the fuel reforming art and are not described in detail.

Block B represents a cooling step wherein the synthesis gas stream from reforming step A is cooled to a temperature of from about 200° C. to about 600° C., and preferably from about 375° C. to about 425° C., to prepare the synthesis gas for process step C (discussed below). This cooling may be achieved with heat sinks, heat pipes, heat exchangers or the like depending upon the design specifications and the extent to which heat is to be recovered/recycled from the synthesis gas. Cooling of the synthesis gas can also be achieved by other means known in the art, e.g., injection of a lower temperature steam into the synthesis gas stream.

Block C represents a desulphurization step. One of the main impurities of many fuels is sulfur, which is commonly converted to hydrogen sulfide during reforming step A. Desulfurization preferably utilizes zinc oxide and/or other material(s) capable of absorbing and converting the hydrogen sulfide, with or without a support (e.g., monolith, extrudate, pellet, etc.). Desulphurization can be accomplished by converting the hydrogen sulfide to zinc sulfide in accordance with the following reaction formula III:

$$H_2S + ZnO \rightarrow H_2O + ZnS \quad (III)$$

Desulfurization is preferably carried out at a temperature of from about 300° C. to about 500° C., and more preferably from about 375° C. to about 425° C.

The desulfurized process stream may then be sent to a mixing step D wherein water received from a water subsystem is optionally added. The addition of water serves the dual purposes of lowering the temperature of the process stream and of supplying additional water for use in the water gas shift reaction to follow. The water vapor and other stream components are mixed by being passed through a stage of inert materials such as ceramic beads or other similar materials that effectively mix and/or assist in the vaporization of water. Alternatively, additional water can be introduced prior to reforming step A and the mixing step can be repositioned or eliminated. Where the process stream is to be subjected to a selective oxidation, a mixing step may also be utilized to mix an oxidant with the process stream prior to oxidation.

Block E represents a water gas shift reaction step that converts carbon monoxide to carbon dioxide in accordance with formula IV:

$$H_2O + CO \rightarrow H_2 + CO_2 \quad (IV)$$

Generally, the water gas shift reaction can take place at temperatures ranging from 150° C. to 600° C. depending on the catalyst. Under such conditions, much of the carbon monoxide in the gas stream is converted to carbon dioxide. Where the hydrogen-enriched reformate is to be used as a fuel for fuel cells, the concentration of carbon monoxide needs to be lowered to a level that can be tolerated by fuel cell catalyst(s), typically below about 50 ppm. Examples of water gas shift catalysts, both low and high temperature catalysts, are well known in the fuel reforming art and are not set forth in detail herein.

Block F represents a cooling step that can be performed in an inert stage or otherwise to reduce the temperature of the process stream to a temperature preferably in the range of from about 90° C. to about 150° C. When the cooling step F is to be followed by a selective or preferential oxidation step, oxygen from an air subsystem can also be added to the process stream.

Block G represents an optional selective or preferential oxidation step wherein much of the remaining carbon monoxide in the process stream is converted to carbon dioxide. Although this oxidation is carried out in the presence of a catalyst having activity for oxidizing carbon monoxide, two reactions typically occur, namely, a desirable oxidation of carbon monoxide (formula V) and an undesirable oxidation of hydrogen (formula VI).

$$CO + \tfrac{1}{2}O_2 \rightarrow CO_2 \quad (V)$$

$$H_2 + \tfrac{1}{2}O_2 \rightarrow H_2O \quad (VI)$$

Since both reactions produce heat and because the preferred oxidation of carbon monoxide is favored by low temperatures, it may be advantageous to optionally include a cooling element such as a cooling coil within an oxidation reaction zone. The oxidation reaction temperature is preferably kept in the range of from about 90° C. to about 150° C. Because an apparatus of the present invention comprises a purification unit such as a pressure swing adsorption unit for separating hydrogen from impurities, the use of selective oxidation step G may be omitted.

The reformate produced by a fuel processor such as that described in reference to FIG. 4 is rich in hydrogen but can contain one or more impurities such as carbon monoxide, carbon dioxide, water, steam, inert components such as nitrogen and argon, various sulfur and nitrogen-containing compounds as well as unreacted hydrocarbons. Thus, the reformate must be subjected to purification or clean-up processes to remove or reduce such impurities to extremely low levels. Further, the reformate is typically at a low pressure, on the order of less than about 50 psig, preferably less than about 25 psig, more preferably less than about 10 psig and still more preferably less than about 5 psig. Depending on the nature of the purification technique to be used, the pressure of the reformate may need to be increased prior to delivery to the purification unit. Therefore, an apparatus of the present invention can optionally include a compression unit downstream of the fuel processor for receiving the reformate and producing a compressed reformate for delivery to the purification unit. In some embodiments, such as where the hydrogen-enriched reformate exiting the purification unit is destined for a storage unit such as in a high pressure tank, a second compression unit can optionally be disposed intermediate the purification unit and the storage unit for increasing the pressure of the hydrogen-enriched reformate.

Compression units are known in the art for compressing mixtures of gases containing hydrogen prior to subjecting the mixtures to separation techniques and/or storage. A more detailed description of such compression technologies can be found in chemical engineering references such as Perry's Chemical Engineers' Handbook, 4$^{th}$ Ed. (McGraw-Hill, © 1963), and in the patent literature such as in U.S. Pat. No. 4,690,695 issued Sep. 1, 1987 to Doshi; U.S. Pat. No. 6,488,747 issued Dec. 3, 2002 to Keefer et al.; and U.S. Application Publication No. US 2003/0175564 A1 published Sep. 18, 2003 by Mitlitsky et al.; the descriptions of which are incorporated by reference. While the compression unit need not be described in exacting detail, it should be recognized that a suitable compression unit can comprise a compressor driven by a fixed or variable speed motor in a single stage or in a multi-stage compression unit comprising two or more compressors. Further, suitable compression units can include axial, centrifugal, reciprocating, rotary-type compressors and combinations of the same. Where the compression unit comprises a compressor operated at a selected speed, the purification unit preferably controls the flow of reformate to the plurality of adsorbent beds independent of the selected speed of the compressor.

The pressures that the compression unit should be capable of imposing on a fluid will depend on the pressure requirements of the unit for which compression is needed. In the case of a purification unit comprising a pressure swing adsorption unit, the pressure required of the flow of reformate to the PSA can vary between about 1 psig and about 600 psig. Where compression is needed to facilitate storage of the hydrogen-enriched reformate, the required pressure of the hydrogen-enriched reformate can vary from just above zero to more than 10,000 psig. One skilled in the art will appreciate that the selection of a suitable compression unit will be based on such factors as the composition of the reformate, its flow rate, pressure and temperature, the pressure requirements of the downstream unit(s), as well as factors such as the compression unit's power consumption, serviceability and cost.

In an embodiment wherein the purification unit comprises a pressure swing adsorption unit ("PSA"), the flow of reformate to a plurality of adsorbent beds within the PSA and the adsorption period during which impurities are adsorbed from the flow of reformate through the adsorbent beds are controlled in a manner that is independent of the speed or output of the compressor(s). More specifically, where the purification unit comprises a rotary-type PSA having a rotary distribution valve for controlling the material flows to the adsorbent beds, the rotary distribution valve is preferably operated independently of the speed or output of the compression unit. In such embodiments, the compression unit can comprise fixed speed compressors.

In embodiments where the compression unit comprises a compressor driven by a fixed speed motor or an induction motor, care should be taken during start-up when the compressor is first energized to ensure that sufficient fluid is present at the inlet of the compressor to prevent the formation of a vacuum. Similar care-should also be exercised during shut-down and during transients of the fuel processor such as prior to resuming hydrogen production from standby status. As an alternative to assuring the presence of sufficient fluid, the speed of the compressor motor can be regulated by adjusting the power applied to the compression unit and the motor. Suitable means for regulating the power can include a variable frequency drive for adjusting the line frequency applied to the motor, a soft start device for varying the voltage applied to the motor, and other means known in the art for regulating the power applied to the motor.

As noted herein, the flow of reformate from the fuel processor can exhibit fluctuations in pressure and/or flow rate, both during transient and steady state operations. Thus, an apparatus of the present invention includes means for reducing or eliminating such fluctuations before they reach the downstream purification unit. As used herein, "reducing fluctuations in pressure and/or flow rate" is intended to refer to reductions in either the size or number of fluctuations in the pressure and/or flow rate of the reformate that is destined for the purification unit. Moreover, such means are also employed to prevent the formation of a vacuum at the inlet of the compression unit within the line(s) carrying reformate to the compression unit.

The means for reducing such fluctuations can comprise a buffer disposed intermediate the fuel processor and the purification unit. Although such a buffer could be disposed at any location intermediate the fuel processor and the purification unit, it is preferably disposed upstream of a compression unit so that a more uniform flow of reformate is provided to an inlet of the compression unit. Those skilled in the art will appreciate that such a buffer will have sufficient volume to receive a variable flow of reformate from the fuel processor while releasing a more uniform flow for delivery to the purification unit. Moreover, in an embodiment where the buffer is disposed upstream from the compression unit, the flow of reformate from the buffer should be sufficient to prevent a vacuum from forming at the compression unit inlet either during start-up or steady state operations.

In embodiments where a compression unit is disposed intermediate the fuel processor and the purification unit, the means for reducing fluctuations in the pressure and/or flow rate can comprise a conduit for providing a controlled flow of a supplemental fluid to an inlet of the compression unit. The supplemental fluid can include a compressed flow of reformate derived from an outlet of the compression unit, a hydrogen-enriched reformate derived from a purification unit, or some mixture thereof. The conduit has an outlet that directs the supplemental fluid into a line carrying reformate from the fuel processor to the compression unit.

The number and location of conduit inlets are determined by the composition of the supplemental fluid. Where the supplemental fluid includes a compressed reformate, the conduit has an inlet downstream of the compression unit. Where the supplemental fluid includes a hydrogen-enriched reformate, the conduit has an inlet downstream from a purification unit. In such an embodiment, the purification unit can optionally include a first outlet for directing a hydrogen-enriched reformate and a second outlet for directing a hydrogen-depleted reformate out of the purification unit with the inlet of the conduit in fluid communication with the first outlet of the purification unit. In addition, the conduit can have two or more inlets depending on the composition of the supplemental fluid. Specifically, where the fuel processing apparatus has a purification unit disposed downstream of the compression unit, the conduit can have an inlet intermediate the compression and purification units for directing compressed reformate into the conduit, and a second inlet downstream of the purification unit for directing a hydrogen-enriched reformate into the conduit.

In some embodiments, the conduit can have a variable-opening valve for controlling the flow of supplemental fluid therethrough. Where the apparatus includes an optional sensor for sensing the fluid flowing from the fuel processor, e.g., reformate, supplemental fluid(s) etc., the variable-opening valve can be operated in response to sensed data generated by the sensor. More specifically, a sensor can be disposed upstream from but proximate to an inlet of a compression unit for acquiring data about the fluid(s) entering the compression unit. Preferably, the sensor will comprise a sensor for sensing the pressure and/or flow rate of the reformate at the inlet of the compression unit. In some embodiments, the sensor will be in communication with a controller so that sensed data can be relayed to the controller for operating the valve in response to the sensed data. By way of illustration, when the controller determines that the pressure and/or flow rate of reformate entering the inlet of the compression unit is below a predetermined level, a signal or instruction is sent to the valve actuator to open the valve and increase the flow of the supplemental fluid to the inlet of the compression unit. Conversely, where the pressure and/or flow rate of the reformate at the inlet of the compression unit is sensed to be at or above the predetermined level, the controller can instruct the valve actuator to constrict or close the valve. In this context, the predetermined level used by the controller to control the operation of the valve is a pressure and/or flow rate of the reformate that will prevent the formation of a vacuum in the line feeding the compression unit. Moreover, such a controller can also be configured to operate the valve assembly in response to the sensed product data described below.

An apparatus of the present invention can include a purification unit disposed downstream of the compression unit for receiving at least a portion of the compressed reformate and producing a hydrogen-enriched reformate. Technologies for removing impurities from and/or concentrating hydrogen within a reformate gas stream are well known in the art and can include, methanation, selective oxidation, membrane separation techniques, temperature swing adsorption and pressure swing adsorption processes.

By way of example, a number of purification processes separate hydrogen from impurities through selective adsorption by passing the hydrogen-containing stream under pressure through a column or bed of adsorbent material and/or through a hydrogen selective membrane. Selective adsorption can be performed with adsorptive materials that adsorb hydrogen and allow a hydrogen-depleted stream to pass, or with materials that adsorb impurity and allow a hydrogen-enriched stream to pass. In either case, is it highly preferred that the adsorbent materials be capable of regeneration, through one or more of such techniques as pressure swing, temperature swing and the like. In an embodiment of the present invention, purification can be carried out utilizing adsorptive materials that selectively adsorb impurities from a flow of reformate and allow a hydrogen-enriched reformate to pass.

The purification unit comprises a plurality of adsorbent beds, each of which is capable of removing one or more impurities from a reformate flowing through the bed. An adsorbent bed can include a vessel for housing adsorbent material(s). The adsorbent materials can take a variety of forms including packed beds of agglomerates, pellets, particles, and/or beads, monolithic structures, as well as various supports coated with adsorbent materials, e.g., coated sheets. In some embodiments, the adsorbent materials are provided as a packed bed having multiple layers of different adsorbent materials and/or mixtures of different adsorbent materials. In other embodiments, the adsorbent bed comprises a coated monolith or other structure configured to provide fluid pathways through the bed. Adsorbent materials suitable for use in the plurality of beds of the purification unit will depend on the materials to be adsorbed and removed from the process stream. By way of example, adsorbent materials known for use in removing water vapor, carbon dioxide and hydrocarbons can include alumina gels, activated carbon, silica gels and zeolites. Moreover, zeolites such as low silica X zeolite and calcium or strontium exchanged chabazite are known for removing carbon monoxide and nitrogen.

The terminology "adsorption period" is used herein to refer to the period or the length of time that a flow of intermediate or compressed reformate is directed through an adsorbent bed for purposes of removing impurity. At the conclusion of an adsorption period, the flow of reformate through a first adsorbent bed is interrupted and the flow is re-directed to a second adsorbent bed so as to continue the removal of impurity and the production of hydrogen-enriched reformate while enabling the first adsorbent bed to be regenerated. It is envisioned that two or more adsorption beds will be operated in an adsorption phase while the other adsorption beds are undergoing various stages of regeneration. Moreover, suitable purification units will include those that are capable of adjusting and manipulating the adsorption period so as to compensate for fluctuations in the pressure and/or flow rate of a reformate that is fed to the unit. The manner in which the adsorption period can be adjusted for purposes of achieving a hydrogen-enriched reformate of desired purity is described in additional detail below.

In some embodiments, the purification unit comprises a pressure swing adsorption ("PSA") unit. Suitable PSA units include those known in the art for separating hydrogen from a process stream, such as are described in U.S. Pat. No. 4,238,204 issued Dec. 9, 1980 to Perry; U.S. Pat. No. 4,690,695 issued Sep. 1, 1987 to Doshi; U.S. Pat. No. 5,256,174 issued Oct. 26, 1993 to Kai et al.; U.S. Pat. No. 5,435,836 issued Jul. 25, 1995 to Anand et al.; U.S. Pat. No. 5,669,960 issued Sep. 23, 1997 to Couche; U.S. Pat. No. 5,753,010 issued May 19, 1998 to Sircar et al.; and U.S. Pat. No. 6,471,744 issued Oct. 29, 2002 to Hill, the descriptions of which are incorporated herein by reference. In some embodiments, the purification unit will comprise a compact PSA. Suitable compact PSAs can include a rotary-type PSA such as are described in U.S. Pat. No. 6,063,161 issued May 16, 2000 to Keefer et al. and in U.S. Pat. No. 6,406,523 issued Jun. 18, 2002 to Connor et al., the descriptions of which are incorporated herein by reference. Compact PSAs having rotary elements are commercially available from Questair Technologies, Inc. of Burnaby, Canada. Questair's rotary-type PSA, model series number H3200, were used in the development of the present invention.

The purification unit includes a valve assembly that is capable of selectively controlling the flow of reformate to one or more of the plurality of adsorbent beds at least in part in response to the sensed product data described below. The valve assembly can comprise single or multiple valves having fixed or variable openings that are opened and closed to control material flows to the adsorbent beds. The valve assembly is capable of providing selective control over the flow of reformate to the adsorbent beds by controlling which adsorbent bed(s) receive a flow of reformate and by controlling the sequence in which different materials are directed through an adsorbent bed. As such, the configuration of the valve assembly provides control over both the adsorption and regeneration phases of each adsorbent bed. Depending on the nature of the adsorbent materials within the beds, control over regeneration can comprise imposing pressure and/or temperature swings, directing various materials through the bed and the like.

In an embodiment where the purification unit comprises a rotary-type PSA, the valve assembly preferably comprises a distribution valve wherein rotation is created between the distribution valve and the plurality of adsorbent beds to cycle the plurality of beds through adsorption-regeneration cycle(s). Such distribution valves are described in U.S. Pat. No. 4,925,464 issued May 15, 1990 to Rabenau et al.; U.S. Pat. No. 5,593,478 issued Jan. 14, 1997 to Hill et al.; U.S. Pat. No. 5,807,423 issued Sep. 15, 1998 to Lemcoff et al.; U.S. Pat. No. 6,056,804 issued May 2, 2000 to Keefer et al.; U.S. Pat. No. 6,372,026 B1 issued Apr. 16, 2002 to Takemasa et al.; U.S. Pat. No. 6,451,095 issued Sep. 17, 2002 to Keefer et al.; and U.S. Pat. No. 6,712,087 issued Mar. 30, 2004 to Hill et al., the descriptions of which are incorporated by reference. Rotation between the valve assembly and the adsorbent beds is preferably created by a variable-speed motor. Whereas the valve assembly controls the sequence of operations for each phase of the plurality of beds, the variable speed motor controls the length of each of those operations and the frequency at which the operations change. For instance, by adjusting the speed of such a motor, the adsorption period for the plurality of beds can be increased or decreased. Moreover, changes in the speed of rotation alter the frequency at which the flow of reformate is switched from a first adsorbent bed to a second adsorbent bed.

An apparatus of the present invention includes a product sensor disposed downstream from the purification unit that is capable of sensing the hydrogen-enriched reformate and/or a hydrogen-depleted reformate and generating sensed product data therefrom. The sensed product data generated by the product sensor is relayed or communicated to the purification unit. The valve assembly within the purification unit controls the flow of reformate to the plurality of adsorbent beds in response to the sensed product data. Preferably, the product sensor is disposed downstream and proximate to an outlet of the purification unit so that changes in the product or exhaust composition are detected quickly and compensating action can be taken. Where an optional tank is disposed downstream of the purification unit for receiving and storing a hydrogen-enriched reformate, the product sensor is disposed upstream from the tank so that off-specification reformate can be detected and diverted before it is received by the tank.

Sensed product data can comprise temperature, pressure, density, flow rate and/or compositional data. The product sensor preferably comprises a gas sensor. The type of sensor selected is determined by the nature of the data that is to be used to control of the flow of reformate. Suitable sensors can include those capable of sensing and relaying temperature, pressure, density, flow rate, and/or compositional data. In some embodiments, the product sensor can comprise a compositional-type sensor for determining the concentration of a component within the hydrogen-enriched reformate and/or a hydrogen-depleted reformate. For instance, suitable sensors for detecting the presence or concentration of carbon monoxide, carbon dioxide, hydrocarbons, water, sulfur-containing compounds, and nitrogen-containing compounds are commercially available. In an embodiment where the product sensor comprises a sensor for sensing compositional data, the sensor is preferably not suitable for sensing the concentration of free oxygen in the hydrogen-enriched reformate and/or a hydrogen-depleted reformate.

In an embodiment where data relating to the concentration of hydrogen in the hydrogen-enriched reformate is needed, the sensor can comprise a sensor capable of sensing the hydrogen concentration, or more preferably, one or more sensors capable of sensing data from which the hydrogen concentration may be determined. A description of a method and apparatus for indirectly determining the hydrogen concentration of a reformate stream being fed to a fuel cell can be found in U.S. Pat. No. 6,770,391 B2 issued Aug. 3, 2004 to Nelson et al., the disclosure of which is incorporated herein by reference. The concentration of hydrogen in the hydrogen-enriched reformate exiting the purification unit should be greater than about 99.96%, preferably greater than about 99.97%, and more preferably greater than about 99.98% by volume. When the sensed product data relayed to the purification unit indicates that the concentration of hydrogen is decreasing, the purification unit can increase the frequency at which the flow of reformate is directed from one adsorbent bed to the next. More specifically, where the purification unit is a rotary-type PSA unit having a variable-speed motor, the speed of the variable-speed motor can be increased to shorten the adsorption period. Similarly, where the sensed product data indicates that the pressure and/or flow-rate of the hydrogen-enriched reformate is increasing, the speed of the variable-speed motor can be increased to shorten the adsorption period and maintain a desired concentration of hydrogen in the hydrogen-enriched reformate.

As noted above, an apparatus of the present invention can optionally include a controller for monitoring and controlling the operation of one or more of the components of the apparatus. Specifically, suitable controllers will be capable of receiving the sensed product data, determining if adjustment of the valve assembly is needed and operating the valve assembly in response to the sensed product data. Where an apparatus includes a product valve for controlling the flow of hydrogen-enriched reformate from the purification unit, the controller can be capable of operating the product valve in response to the sensed product data. Where the apparatus includes a compression unit, a conduit for providing a controlled flow of supplemental fluid to an inlet of the compression unit, and a sensor for sensing the pressure and/or flow rate of the reformate, the controller can be capable of controlling the flow of supplemental fluid in response to sensed pressure and/or flow rate.

In some embodiments, the controller can also include means for correlating the adsorption period of the purification unit at a given pressure with the composition and flow of hydrogen-enriched reformate that is to be produced. Such means can include a process model of the purification unit that is capable of determining the operational settings of the purification unit, e.g., the adsorption period or other cycle times, at various pressures for producing a given hydrogen-enriched reformate. In an alternative, such means can include a set of correlated data stored, preferably in table form, for access by the controller. Regardless of the means used, the means will provide the controller with instructions for setting or adjusting the operation of the purification unit at various pressures to produce a hydrogen-enriched reformate having a selected composition and flow rate. In an embodiment where the purification unit is a rotary-type PSA having a variable speed motor, the means for correlating can include a look-up table wherein hydrogen-enriched reformate compositions and flow rates at various pressures are correlated with various motor speeds that will produce the desired hydrogen-enriched reformate composition. Such a look-up table can also be used by the controller to adjust or implement changes in the speed of the variable speed motor based on sensed changes in the hydrogen-enriched reformate at a given pressure.

In some embodiments, the controller is implemented on a single computing system for controlling each facet of the operation of the apparatus that is not under manual control. In other embodiments, the controller can comprise multiple computing systems, each for controlling some designated facet of the operation of the apparatus. The controller can be rack-mounted or implemented as a desktop personal computer, a workstation, a notebook or laptop computer, an embedded processor, or the like. Indeed, this aspect of any given implementation is not material to the practice of the invention.

The computing system preferably includes a processor communicating with memory storage over a bus system. The memory storage can include a hard disk and/or random access memory ("RAM") and/or removable storage such as a floppy magnetic disk and/or an optical disk. The memory storage is encoded with a data structure for storing acquired data, an operating system, user interface software, and an application. The user interface software, in conjunction with a display, implements a user interface. The user interface can include peripheral I/O devices such as a key pad or keyboard, mouse, or joystick. The processor runs under the control of the operating system, which may be practically any operating system known to the art. The application is invoked by the operating system upon power up, reset, or both, depending on the implementation of the operating system.

Software implemented aspects of the invention are typically encoded on some form of program storage medium or implemented over some type of transmission medium. The transmission medium may be twisted wire pairs, coaxial cable, optical fiber, or some other suitable transmission medium known to the art. Some portions of the detailed descriptions herein are presented in terms of a software implemented process involving symbolic representations of operations on data bits within a memory in a computing system. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, data, elements, symbols, instructions, characters, terms, numbers, or the like. It should be borne in mind, however, that all of these and similar terms are to be associated with the appropriate physical quantities and are merely convenient labels applied to these quantities. Furthermore, the actions and processes of an electronic device that manipulates and transforms data represented as physical (electronic, magnetic, or optical) quantities within some electronic device's storage into other data similarly represented as physical quantities have been denoted by terms such as "processing," "computing," "calculating," "comparing," "determining," "displaying," and the like.

An apparatus of the present invention can optionally include a product valve for use in controlling a flow of hydrogen-enriched reformate from the purification unit. In some embodiments, the product valve comprises a variable-opening valve. The product valve can be operated in part in response to sensed product data generated by the product sensor. Where the apparatus comprises a controller capable of receiving the sensed product data, the controller can be operate the product valve in response to the sensed product data. Preferably, the product valve is disposed downstream of the product sensor so that changes in the hydrogen-enriched reformate are detected quickly and compensating action can be taken to maintain the composition of the hydrogen-enriched reformate. In addition, where an optional tank is disposed downstream of the purification unit for storing a hydrogen-enriched reformate, the product valve is disposed upstream from the tank so that off-specification reformate can be detected and diverted before it is received by the tank. Control over the flow of hydrogen-enriched reformate out of the purification unit can also be used to create back-pressure within the purification unit to maintain a more stable pressure within the purification unit. Moreover, such control can also provide additional control over the flow rate of reformate through the purification unit for purposes of maintaining the composition of the hydrogen-enriched reformate.

An apparatus of the present invention can optionally include a storage unit disposed downstream of the purification unit for storing a hydrogen-enriched reformate. A compression unit can optionally be included for producing a flow of compressed hydrogen-enriched reformate for storage depending on the pressure requirements of the particular storage unit selected. Moreover, a second conduit can be included that is capable of providing a controlled flow of compressed hydrogen-enriched reformate to the inlet of the second compression unit. The second conduit preferably has an inlet disposed intermediate the second compression unit and the storage unit, a valve for controlling the flow of compressed hydrogen-enriched reformate through the conduit, and an outlet disposed intermediate an outlet of the purification unit and the inlet to the second compression unit.

A storage unit suitable for use in an apparatus of the present invention can be selected from hydrogen storage devices that are known in the art. Preferably, the hydrogen storage device will comprise a storage vessel suitable for containing the hydrogen-enriched reformate in a desired form, including but not limited to, pressurized gas, liquefied gas or solid. Suitable storage vessels can be portable, modular, skid mounted or fixed in place. Further, a selected storage unit preferably has sufficient storage capacity to enable the unit to deliver stored product to an outlet at a selected rate during periods in which the fuel processor is not operating and/or during periods of peak demand when the volume of product produced by the fuel processor must be supplemented to meet demand.

The hydrogen storage unit may comprise a high pressure vessel operably connected in fluid communication with a compression unit for storing a compressed product. Suitable storage units can also utilize hydrogen-fixing material(s) that can reversibly fix hydrogen. Hydrogen-fixing materials are known in the hydrogen storage art and can include activated carbon, carbon composites, fullerene-based materials, metal hydrides, alloys of titanium, vanadium, chromium and manganese, with or without additional elements, magnetic hydrogen-absorbing material, and nanostructures formed from light elements selected from the second and third rows of the periodic table. Examples of vessels containing hydrogen-fixing material for storing compressed hydrogen are described in U.S. Pat. No. 4,598,836 issued Jul. 8, 1986 to Wessel and U.S. Pat. No. 6,432,176 B1 issued Aug. 13, 2002 to Klos et al., the disclosures of which are incorporated herein by reference. In still other embodiments, the storage unit can comprise a liquefaction unit capable of converting the hydrogen-rich product to a liquefied product through cryogenic cooling or other liquefaction techniques.

An apparatus of the present invention can optionally include one or more sensors disposed throughout the apparatus for sensing the temperature, composition, density, pressure and/or flow rate of fluids at various locations within the apparatus. Those skilled in the art will appreciate that sensed data such as temperature and pressure can be used to calculate other fluid conditions such as product density using methods such as those described in U.S. Pat. No. 6,619,336 issued Sep. 16, 2003 to Cohen et al. In addition, sensed compositional information can be used for a variety of purposes including estimating the hydrogen concentration of the product as is described in U.S. Pat. No. 6,770,391 B2 issued Aug. 3, 2004 to Nelson et al. Sensors for sensing and monitoring the apparatus and fluid conditions of temperature, composition, pressure and flow rate are known and commercially available.

In a process aspect of the present invention, a method for producing a hydrogen-enriched reformate is provided. The method includes producing a flow of reformate comprising hydrogen and an impurity in a fuel processor. The reformate produced by a fuel processor can have fluctuations in pressure and/or flow rate and the method includes reducing these fluctuations. A flow of the reformate is directed to one or more of a plurality of adsorbent beds within a purification unit for an adsorption period to remove impurity from the reformate and produce a hydrogen-enriched reformate. The hydrogen-enriched reformate or a hydrogen-depleted reformate is sensed to produce sensed product data and the adsorption period is adjusted in response to the sensed product data. Optionally, the method can include compressing the reformate in a compression unit to produce a compressed reformate for delivery to the purification unit.

The production of a reformate is described in detail above and is not repeated here. The reformate produced can have fluctuations in composition, pressure and/or flow rate and the method includes reducing these fluctuations. The fluctuations can be reduced or dampened by buffering the reformate produced by the fuel processor. In embodiments where the reformate is compressed prior to delivery to a purification unit, the fluctuations of pressure and/or flow rate can be reduced by providing a controlled flow of a supplemental fluid to an inlet of the compression unit. Such a method can optionally include sensing the pressure and/or flow rate of the reformate prior to compressing the reformate and controlling the flow of supplemental fluid in response to the sensed pressure and/or flow rate. The reformate can be compressed in a compressor that is driven by a fixed or variable speed motor. In a method where the reformate is compressed in a compressor having a fixed speed or induction motor, the power to the compressor should be regulated and gradually increased during start up and other transients to prevent the formation of a vacuum in the line carrying reformate to the compressor. Moreover, when the method includes compressing the reformate in a compressor operated at a selected speed, the adsorption period is preferably set and adjusted independent of the speed of the compressor.

Impurity can be removed from the reformate in a purification unit to produce a hydrogen-enriched reformate. Preferably, impurity is removed from the reformate through selective adsorption, and thus, the method includes the step of directing a flow of reformate to one or more of a plurality of adsorption beds for an adsorption period to remove impurity from the reformate and produce a hydrogen-enriched reformate. It is preferred that the purification unit have a plurality of adsorbent beds so that the flow of reformate through a first adsorbent bed can be interrupted and re-directed through a second adsorbent bed to continue the removal of impurity and the production of hydrogen-enriched reformate. Further, the interruption of the flow of reformate through the first adsorbent bed and its re-direction enables the first adsorbent bed to be regenerated. Regeneration can include one or more of depressurizing, purging, heating, cooling and re-pressurizing the bed and the adsorbent materials therein. Regeneration of an adsorbent bed favors the release of adsorbed impurities to produce a flow of exhaust or a hydrogen-depleted product that comprises the previously adsorbed impurities. Therefore, a method of the present invention can optionally include regenerating at least one of the plurality of adsorbent beds to produce the hydrogen-depleted reformate while the flow of reformate is directed to one or more of the other beds.

In an embodiment where the purification unit comprises a PSA, the efficacy of removing impurity from a flow of reformate in a PSA unit depends on the design and materials of the PSA, the flow rate and composition of the reformate as well as the pressure within the PSA. The design and materials of a suitable PSA are detailed above. Typically, the flow of reformate from a fuel processor to the adsorbent beds of a PSA unit is between about 150 slpm and about 370 slpm, where standard units represent 25° C. at 1 atm pressure. The composition of the reformate can vary but will typically include $CO<1\%$, $CH_4<2\%$, $CO_2>15\%$ and $H_2>40\%$. The pressure within the PSA unit should be between about 70 psig and about 350 psig, but is preferably less than about 200 psig. Moreover, the pressure within the PSA is preferably fixed or stable while the PSA unit is removing impurity from the reformate. When the PSA unit is properly adjusted, a hydrogen-enriched reformate having a hydrogen concentration of at least about 99.90% by volume, can be produced at a rate of between about 40 slpm and about 120 slpm.

The hydrogen-enriched reformate or a hydrogen-depleted reformate is sensed to generate sensed product data. The hydrogen-enriched reformate or hydrogen-depleted reformate is sensed downstream proximate to the purification unit so that sensed data indicative of changes in the hydrogen-enriched reformate composition is detected and compensatory action can be taken quickly. The sensed product data can include temperature, pressure, density, flow rate, and/or compositional data.

The adsorption period is adjusted in response to the sensed product data. Where the purification unit includes a pressure swing adsorption unit comprising a plurality of adsorbent beds, a valve assembly and a variable speed motor capable of creating rotation between the plurality of adsorbent beds and the valve assembly, the adsorption period can be adjusted by adjusting the speed of the variable speed motor. The speed of the motor for producing a hydrogen product having the desired purity and flow rate is design specific. In the case of a Questair H3200 series model PSA, the speed of the variable speed motor is preferably selected and adjusted within a range between about 3 to about 11 rpm to achieve the composition and flow rates noted above. A process model of the purification unit or correlated data in a look-up table can be used to adjust the adsorption period and thereby the operation of the purification unit. By way of example, where the concentration of hydrogen in the hydrogen-enriched reformate is measured or determined to be decreasing, the speed of the variable speed motor can be increased to increase the frequency at which the flow of reformate is directed from one bed to the next. By increasing the frequency in this manner, the adsorption period during which the flow of reformate flows through one or more of the adsorption beds is shortened. In an optional but preferred embodiment, the adsorption period is adjusted independent of the speed of the compressor.

A method of the present invention can optionally include controlling the flow of hydrogen-enriched reformate out of the purification unit, at least in part, in response to the sensed product data. The flow of hydrogen-enriched reformate out of the purification unit can be controlled by a variable-opening product valve. This valve can be controlled by receiving sensed product data directly from the product sensor or from an optional controller as described above. A method of the present invention can optionally include storing the hydrogen-enriched reformate in a tank and sensing the hydrogen-enriched reformate upstream from the tank, intermediate the purification unit and the tank. Where the hydrogen-enriched reformate is to be stored in a storage unit that requires the reformate to be at an elevated pressure, the flow of hydrogen-enriched reformate from the purification unit can be compressed in a second compression unit not unlike the compression unit described above.

DETAILED DESCRIPTION OF THE FIGURES

Figure 1:
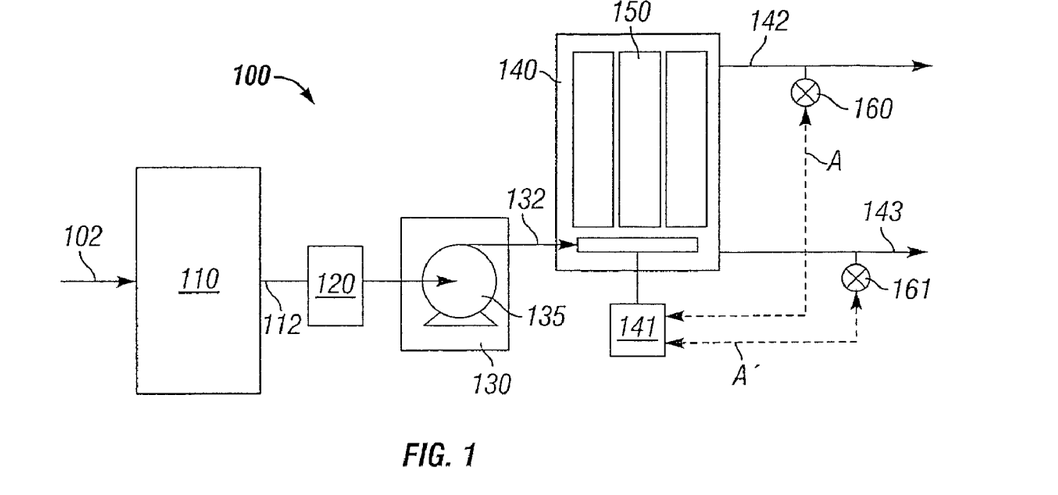
FIG. 1 is a schematic illustration of an embodiment of the present invention comprising a fuel processor and a purification unit.

As illustrated in FIG. 1, apparatus 100 includes fuel processor 110 with feed 102. The nature of the fuel processor will control the number and nature of the feeds. For instance, where fuel processor 110 includes a reformer, the feed lines will include conduits for delivering reactants such as fuel, oxidant, and optionally water or steam, depending on the nature of the fuel processing reaction(s) to be performed. Regardless of the nature of fuel processor 110, the feeds are converted to a reformate that includes hydrogen and one or more impurities. The reformate produced by fuel processor 110 can have fluctuations in pressure, flow rate and/or composition, both during transient and steady state operations.

The flow of reformate is directed from fuel processor 110 to compression unit 130 via line 112. Means 120 are provided intermediate the compression unit and the fuel processor for reducing the fluctuations in the pressure and/or flow rate of the reformate. As illustrated, means 120 is a buffer having sufficient capacity to enable it to receive a variable flow of reformate and provide a flow of reformate to the compression unit that has more uniform pressure, flow rate and composition. Compression unit 130 has one or more compressors 135 for receiving the reformate and producing a flow of compressed reformate for delivery to purification unit 140 via line 132.

Purification unit 140 uses selective adsorption to remove impurities from the reformate by directing the compressed reformate through a bed of adsorbent material(s) that preferentially adsorb impurities and allow a reformate enriched with hydrogen to flow out of the bed. As illustrated in FIG. 1, purification unit 140 is a pressure swing adsorption unit having a plurality of adsorption beds 150 and valve assembly 145. Material flows to each of the plurality of adsorption beds 150 are controlled by valve assembly 145. The purification unit further comprises a variable speed motor 141 for creating rotation between valve assembly 145 and adsorbent beds 150. The configuration of valve assembly 145 and the speed of variable speed motor 141 determine the operational phase of an adsorbent bed and the rate at which the bed progresses through a cycle of adsorption and regeneration. During such a cycle, an adsorption bed can receive a flow of reformate, a flow of purge gas, can be depressurized, evacuated, heated, cooled and/or re-pressurized among other possible operations. It should be noted that sources and sinks for pressurization, purge gases and the like, as well as details concerning valve assembly 145 have not been illustrated in FIG. 1 so as not to obscure the invention.

During operation, the compressed reformate is directed into the purification unit and flowed through one or more of adsorbent beds 150 for an adsorption period. The length of the adsorption period is determined by the configuration of the valve assembly 145 and the speed of motor 141. During the adsorption period, impurities within the flow of reformate are removed within the adsorbent bed(s) to produce a flow of hydrogen-enriched reformate that is directed out of the purification unit through line 142. As noted herein, the purity of the hydrogen-enriched reformate can depend on a number of factors including the type of adsorbent material, the configuration and geometries of the bed, the composition and flow rate of reformate, as well as the pressure and temperature conditions. For a given bed and adsorbent material, the length of the adsorption period will have a direct bearing on the purity of the hydrogen-enriched reformate and can be adjusted to manipulate the composition of the hydrogen-enriched reformate or to compensate for fluctuations in pressure and/or flow rate of the reformate produced by fuel processor 110.

Product sensor 160 is disposed downstream of purification unit 140 for sensing the hydrogen-enriched reformate flowing through line 142 and generating sensed product data. The sensed product data can include compositional information concerning the hydrogen-enriched reformate. As indicated by broken line A, the sensed product data is relayed or communicated to the variable speed motor 141, which is operated, at least-in part, in response to the sensed product data. By adjusting the speed of motor 141 in response to sensed changes in the hydrogen-enriched reformate composition, the adsorption period can be adjusted to compensate for changes in reformate composition, flow rate, pressure and other factors that could negatively impact the purity of the hydrogen-enriched reformate. Further, such sensed data can be used to divert off-spec hydrogen-enriched reformate out of line 142 before it is delivered to storage or an end-user.

When one or more of the adsorbent beds 150 is regenerated, a hydrogen-depleted reformate is produced. As illustrated in FIG. 1, the hydrogen-depleted reformate is directed out of the purification unit through line 143. Line 143 is provided with a product sensor 161 for sensing the hydrogen-depleted reformate flowing through line 143. As indicated by broken line A', the sensed product data is relayed or communicated to the variable speed motor 141, which is operated, at least in part, in response to the sensed product data.

Figure 2:
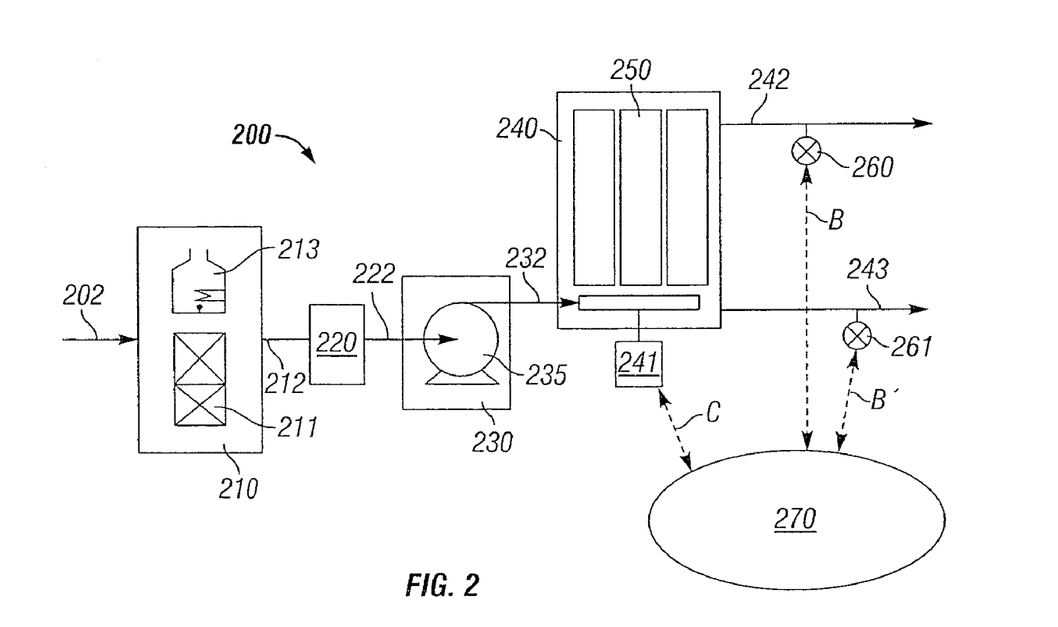
FIG. 2 is a schematic illustration of an embodiment of the present invention comprising a fuel processor and a purification unit.

FIG. 2 illustrates an embodiment 200 of the present invention wherein the apparatus comprises fuel processor 210 having oxidizer 213 and reformer 211. Feed 202 delivers a fuel, oxidant and water for reforming in the fuel processor 210. The reformats produced in fuel processor 210 is directed to buffer 220 via line 212, and then to compression unit 230 via line 222. The flow of reformate is compressed within compression unit 230 by compressor 235 prior to being directed to purification unit 240. Purification unit 240 is not unlike the purification unit illustrated in FIG. 1, having a plurality of adsorbent beds 250, a valve assembly 245 and a variable speed motor 241 for creating rotation between the adsorbent beds and the valve assembly. Product sensor 260 is positioned downstream of the purification unit for sensing the hydrogen-enriched reformate flowing out of the purification unit through line 242. Product sensor 261 is positioned downstream of the purification unit for sensing the hydrogen-depleted reformate flowing out of the purification unit through line 243. The sensed product data is relayed to controller 270 from product sensors 260 and 261 as indicated by broken lines B and B'. Based at least in part on the sensed product data, the controller determines if the speed of variable speed motor 241 requires adjustment. Where an adjustment is needed, controller 270 determines the adjustment and communicates an appropriate instruction to motor 241 as indicated by broken line C.

Figure 3:
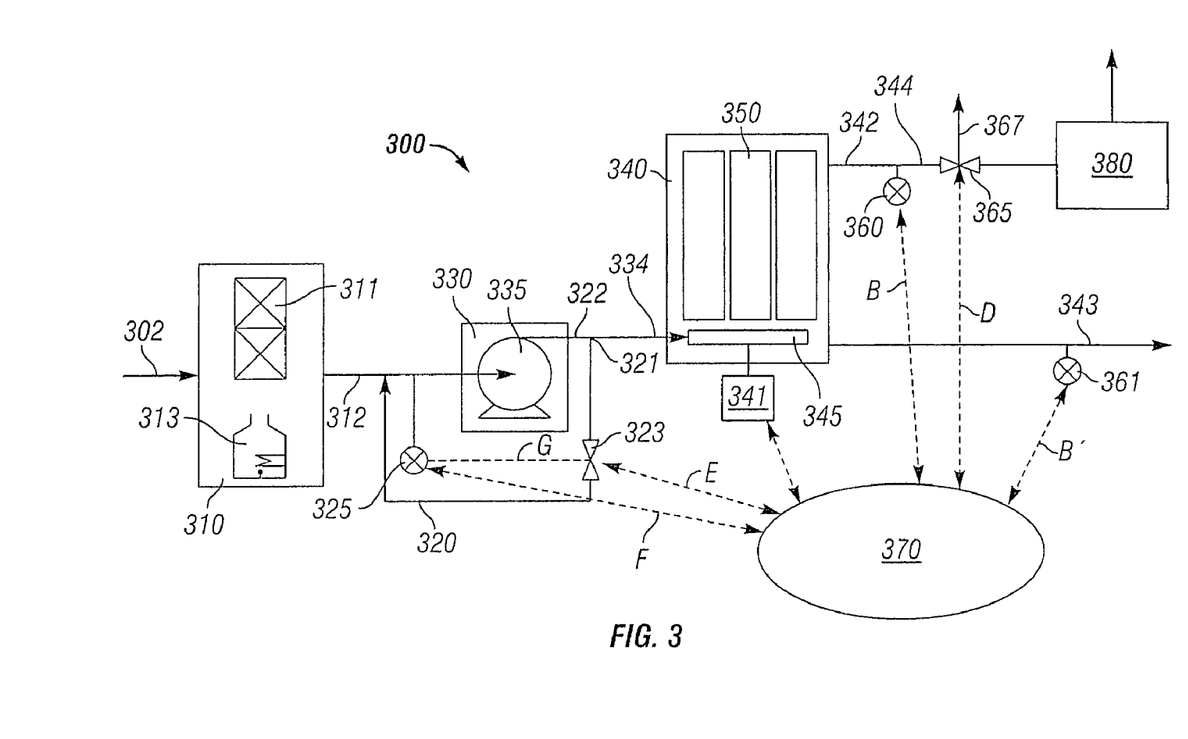
FIG. 3 is a schematic illustration of an embodiment of the present invention comprising a fuel processor and a purification unit.

The embodiment 300 illustrated in FIG. 3 has a fuel processor 310, a compression unit 330, a purification unit 340, tank 380 and controller 370. As illustrated, feed 302 delivers a fuel, oxidant and water for reforming in the fuel processing unit 310. Fuel processor 310 includes an oxidizer 313 wherein fuel and oxidant are pre-heated and water is converted to steam. The fuel processor also includes a reforming reactor 311 wherein the pre-heated reactants are converted to a reformate comprising hydrogen and one or more impurities.

As noted herein, a flow of reformate from fuel processor 310 can have variations or fluctuations in composition, pressure and/or flow rate. To reduce such fluctuations, conduit 320 having inlet 321 and variable-opening valve 323 are provided for directing a controlled flow of compressed reformate to line 312. Sensor 325 is provided upstream of compression unit 330 for sensing the pressure and/or flow rate of reformate in line 312. Sensed pressure and/or flow rate data from sensor 325 can be relayed directly to variable-opening valve 323, as indicated by broken line G, for use in controlling the position of valve 323. In the alternative, the data generated by sensor 325 can be relayed to controller 370 for use in operating valve 323, as indicated by broken lines F and E. A flow of compressed reformate to line 312 via conduit 320 serves to dampen fluctuations in the pressure and/or flow rate of the reformate delivered to the compression unit and prevents the formation of a vacuum within line 312 that might otherwise draw and mix atmospheric gases with the reformate.

The reformate produced in fuel processor 310 is directed to compression unit 320 via line 312. The compression unit receives the reformate and produces a flow of compressed reformate that is directed to purification unit 330 through line 332. Purification unit 330 has a plurality of adsorbent beds 350, a valve assembly 345 and a variable speed motor 341 for creating rotation between the adsorbent beds and the valve assembly. The operation of purification unit 330 is similar to the operation of the purification units illustrated in FIG. 1 and FIG. 2. Product sensor 360 is positioned downstream of the purification unit for sensing the hydrogen-enriched reformate flowing out of the purification unit through line 342. Product sensor 361 is positioned downstream of the purification unit for sensing the hydrogen-depleted reformate flowing out of the purification unit through line 343. The sensed product data is relayed to controller 370 from product sensors 360 and 361 as indicated by broken line B and B' respectively. Based at least in part on the sensed product data, the controller determines if the speed of variable speed motor 341 requires adjustment. Where an adjustment is needed, controller 370 determines the adjustment and communicates an appropriate instruction to motor 341 as indicated by broken line C.

Product valve 365, a variable-opening valve, is disposed in line 342 for controlling the flow of hydrogen-enriched reformate out of the purification unit. As illustrated, product valve 365 is controlled based on instructions communicated from controller 370 as indicated by broken line D. Instructions from controller 370 can be based upon sensed product data generated by product sensor 360 and/or the data generated by sensor 325. Controller 370 can also instruct product valve 365 to divert off-specification hydrogen-enriched reformate to line 367 based on sensed product data from product sensor 360. Tank 380 is provided downstream from the purification unit and product sensor 360 for receiving and storing the hydrogen-enriched reformate, at least temporarily, prior to dispensing or further processing.

Figure 5:
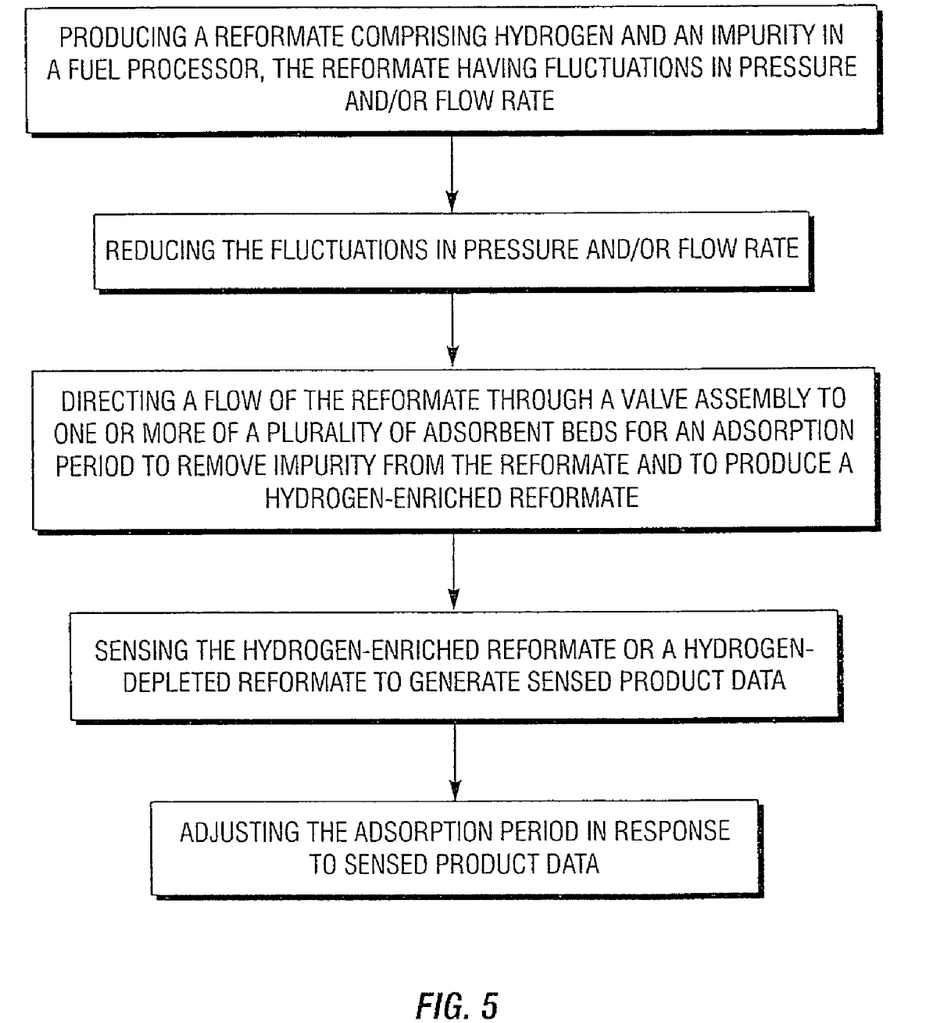
FIG. 5 is a block diagram illustrating a method of the present invention.

FIG. 4 is block diagram illustrating various process steps in a fuel processing operation. The steps illustrated in FIG. 4 were described in detail above and are not repeated here. FIG. 5 is a block diagram illustrated the steps of a method for generating a hydrogen-enriched reformate from a flow of reformate comprising hydrogen and an impurity. The steps of the method are described in detail above and are not repeated here.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An apparatus for producing hydrogen-enriched reformate comprising:
    a fuel processor for producing a reformate comprising hydrogen and an impurity, the reformate having fluctuations in pressure and/or flow rate;
    means for reducing the fluctuations in pressure and/or flow rate;
    a purification unit capable of removing impurity from the reformate to produce a hydrogen-enriched reformate, the purification unit having a plurality of adsorbent beds and a valve assembly capable of selectively controlling a flow of the reformate to one or more of the plurality of adsorbent beds; and
    a product sensor disposed downstream of the purification unit capable of sensing the hydrogen-enriched reformate and/or a hydrogen-depleted reformate to generate sensed product data; wherein the valve assembly controls the flow of reformate in response to the sensed product data.

2. The apparatus of claim 1, wherein the fuel processor comprises an oxidizer and a reformer.

3. The apparatus of claim 1, wherein each of the plurality of adsorbent beds comprises an adsorbent material for selectively adsorbing impurity from the flow of reformate.

4. The apparatus of claim 1, wherein the purification unit comprises a variable-speed motor capable of creating rotation between the valve assembly and the plurality of adsorbent beds.

5. The apparatus of claim 1, wherein the sensed product data comprises one or more of temperature, pressure, density, flow rate, and/or compositional data.

6. The apparatus of claim 1, further comprising a controller capable of operating the valve assembly in response to sensed product data.

7. The apparatus of claim 6, further comprising a product valve disposed downstream of the product sensor and wherein the controller is capable of operating the product valve in response to the sensed product data.

8. The apparatus of claim 1, further comprising a compression unit capable of receiving the reformate and producing a compressed reformate for delivery to the purification unit.

9. The apparatus of claim 8, wherein the compression unit comprises a compressor operated at a selected speed and the valve assembly controls the flow of compressed reformate to the plurality of adsorbent beds independent of the speed of the compressor.

10. The apparatus of claim 9, wherein the means for reducing fluctuations in pressure and/or flow rate comprises a conduit having a variable opening valve capable of controlling a flow of compressed reformate through the conduit to an inlet of the compression unit.

11. The apparatus of claim 10, further comprising a sensor disposed upstream of the compression unit capable of sensing the pressure and/or flow rate of the reformate and wherein the variable opening valve is operated in response to a sensed pressure and/or flow rate.

12. The apparatus of claim 11, further comprising a controller capable of operating the variable-opening valve in response to the sensed pressure and/or flow rate.

13. The apparatus of claim 12, wherein the controller capable of operating the valve assembly in response to sensed product data.

14. The apparatus of claim 1, wherein the means for reducing fluctuations in pressure and/or flow rate comprises a buffer disposed intermediate the fuel processor and the purification unit.

15. The apparatus of claim 1, further comprising a tank disposed downstream from the product sensor capable of storing the hydrogen-enriched reformate.

16. A method for producing a hydrogen-enriched reformate, the method comprising:
producing a reformate comprising hydrogen and an impurity in a fuel processor, the reformate having fluctuations in pressure and/or flow rate;
reducing the fluctuations in the pressure and/or flow rate;
directing a flow of the reformate through a valve assembly to one or more of a plurality of adsorbent beds within a purification unit for an adsorption period to remove impurity from the reformate and to produce a hydrogen-enriched reformate;
sensing the hydrogen-enriched reformate or a hydrogen-depleted reformate to produce sensed product data; and
adjusting the adsorption period in response to the sensed product data.

17. The method of claim 16, further comprising compressing the reformate in a compression unit to produce a compressed reformate.

18. The method of claim 17, wherein the fluctuations in the pressure and/or flow rate of the reformate are reduced by providing a controlled flow of a supplemental fluid to an inlet of the compression unit.

19. The method of claim 18, further comprising sensing the pressure and/or flow rate of the reformate and controlling the flow of the supplemental fluid to the inlet of the compression unit in response to the sensed pressure and/or flow rate.

20. The method of claim 16, wherein reducing fluctuations in the pressure and/or flow rate comprises buffering the reformate produced by the fuel processor.

21. The method of claim 17, wherein the compression unit comprises a compressor operated at a selected speed, and wherein the adsorption period is adjusted independent of the speed of the compressor.

22. The method of claim 16, wherein the purification unit comprises a variable speed motor capable of creating rotation between the valve assembly and the plurality of adsorbent beds, and wherein the adsorption period is adjusted by adjusting the speed of the variable speed motor.

23. The method of claim 22, wherein adjustment of the adsorption period comprises using a look-up table having correlations of sensed product data with one or more of a hydrogen-enriched reformate composition, hydrogen-enriched reformate flow rate, reformate pressure, and the speed of the variable speed motor.

24. The method of claim 16, wherein impurity is removed from the flow of reformate within the plurality of adsorbent beds by adsorbent material capable of selectively adsorbing the impurity.

25. The method of claim 16, wherein the sensed product data comprises temperature, pressure, density, flow rate, and/or composition data.

26. The method of claim 16, further comprising controlling a flow of hydrogen-enriched reformate out of the purification unit in response to the sensed product data.

27. The method of claim 16, further comprising storing the hydrogen-enriched reformate in a tank, and wherein the hydrogen-enriched reformate is sensed upstream from the tank.

28. The method of claim 16, further comprising regenerating at least one of the plurality of adsorbent beds to produce the hydrogen-depleted reformate.

* * * * *